(12) United States Patent
Lafleche et al.

(10) Patent No.: US 11,995,064 B2
(45) Date of Patent: May 28, 2024

(54) MODULE EXPIRATION MANAGEMENT

(71) Applicant: Palantir Technologies Inc., Denver, CO (US)

(72) Inventors: Jonathan Lafleche, London (GB); Justin Uang, New York, NY (US); Onur Satici, London (GB); Yifei Huang, Naperville, IL (US); Ovidiu-Dan Sanduleac, London (GB); Lawrence Manning, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 267 days.

(21) Appl. No.: 17/469,767

(22) Filed: Sep. 8, 2021

(65) Prior Publication Data

US 2021/0406247 A1    Dec. 30, 2021

Related U.S. Application Data

(63) Continuation of application No. 16/252,363, filed on Jan. 18, 2019, now Pat. No. 11,120,007.

(60) Provisional application No. 62/771,316, filed on Nov. 26, 2018.

(51) Int. Cl.
*G06F 9/48* (2006.01)
*G06F 16/21* (2019.01)
*G06F 16/23* (2019.01)

(52) U.S. Cl.
CPC .......... *G06F 16/2365* (2019.01); *G06F 9/485* (2013.01); *G06F 16/219* (2019.01)

(58) Field of Classification Search
CPC ... H04L 67/568; G06F 9/485; G06F 16/2365; G06F 16/219
USPC .......................................................... 709/227
See application file for complete search history.

(56) References Cited

U.S. PATENT DOCUMENTS

| | | | |
|---|---|---|---|
| 7,552,220 B2 * | 6/2009 | Marmigere | H04L 9/40 |
| | | | 709/227 |
| 9,363,329 B1 * | 6/2016 | Kolam | H04L 67/02 |
| 9,442,850 B1 * | 9/2016 | Rangarajan | G06F 16/10 |
| 9,817,840 B1 * | 11/2017 | Emelyanov | G06F 16/172 |
| 2008/0034003 A1 * | 2/2008 | Stakutis | G06F 16/125 |
| 2009/0235347 A1 * | 9/2009 | Syed | H04L 63/06 |
| | | | 726/10 |
| 2013/0318191 A1 * | 11/2013 | Yin | H04L 67/5682 |
| | | | 709/213 |

* cited by examiner

*Primary Examiner* — Meng Vang
(74) *Attorney, Agent, or Firm* — Sheppard Mullin Richter & Hampton LLP

(57) ABSTRACT

Systems, methods, and non-transitory computer readable media are provided for managing expiration of modules. An expiry dataset may be maintained. The expiry dataset may include a set of identifiers corresponding to a set of modules, a set of expiry values for the set of modules, and a set of termination tasks for the set of modules. A request to refresh a module may be received from a client. Responsive to the reception of the request, an expiry value and a termination task for the module within the expiry dataset may be updated. The expiry value may be independent of a timestamp associated with the request.

19 Claims, 5 Drawing Sheets

| Identifier | Expiry Value | Termination Task |
|---|---|---|
| ID-A | Value A | Task A |
| ID-B | Value B | Task B |
| ID-C | Value C | Task C |
| ID-D | Value D | Task D |

MODULE EXPIRATION MANAGEMENT

CROSS REFERENCE TO RELATED APPLICATIONS

This application is a continuation of U.S. application Ser. No. 16/252,363, filed Jan. 18, 2019, which claims the benefit under 35 U.S.C. § 119(e) of U.S. Application No. 62/771,316, filed Nov. 26, 2018, the contents of which are incorporated by reference in their entirety into the present disclosure.

FIELD OF THE INVENTION

This disclosure relates to approaches for managing expiration of modules.

BACKGROUND

Under conventional approaches, a module for performing a task may be terminated based on failure of a client to indicate the need for the module. For example, a client may need to ping a module manager on a periodic basis that the client requires a module to keep the module alive. If the module manager fails to receive a ping from a client within a certain amount of time, the module manager may terminate the module. Such management of module expiration may be performed using timestamps. However, usage of timestamps for module expiration may not scale efficiently.

SUMMARY

Various embodiments of the present disclosure may include systems, methods, and non-transitory computer readable media configured to facilitate management of module expiration. An expiry dataset may be maintained. The expiry dataset may include a set of identifiers corresponding to a set of modules, a set of expiry values for the set of modules, and a set of termination tasks for the set of modules. A request to refresh a module may be received from a client. Responsive to the reception of the request, an expiry value and a termination task for the module within the expiry dataset may be updated. The expiry value may be independent of a timestamp associated with the request.

In some embodiments, updating the expiry value may include inserting a random number as the expiry value. The random number may include a thirty-two bit number. The random number may be inserted as the expiry value without reading the expiry value.

In some embodiments, updating the expiry value may include incrementing a version number as the expiry value.

In some embodiments, the termination task may include a task to terminate the module at a future time. Updating the termination task may include canceling an existing termination task and creating a new termination task.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 illustrates an example expiry dataset, in accordance with various embodiments.

DETAILED DESCRIPTION

A claimed solution rooted in computer technology overcomes problems specifically arising in the realm of computer technology. In various implementations, a computing system is configured to maintain an expiry dataset. The expiry dataset may be maintained using an in-memory map and/or a database. For example, the expiry dataset may be maintained within an external database, and one or more values of the expiry dataset may be cached in-memory to start the expiry timer. The expiry dataset may include a set of identifiers corresponding to a set of modules, a set of expiry values for the set of modules, and a set of termination tasks for the set of modules. For example, the expiry dataset (e.g., expiry table) may include values corresponding to module identifiers, expiry values that changes based on requests from clients (e.g., pings) to refresh the modules, and scheduled tasks to terminate the modules. The computing system may receive a request to refresh a module from a client. Responsive to the reception of the request, the computing system may update an expiry value and a termination task for the module within the expiry dataset. The expiry value may be independent of a timestamp associated with the request. For instance, the expiry value may include a random number or a version number, which may not include or may not be dependent on the timestamp at which the request was sent by the client or received by the computing system. Use of such timestamp-independent expiry values may increase the efficiency and accuracy of the module expiration management.

In some embodiments, updating the expiry value may include inserting a random number as the expiry value. The random number may include a thirty-two bit number. The random number may be inserted as the expiry value without reading the expiry value. That is, updating the expiry value may include inserting the random number as the expiry value without reading the existing expiry value.

In some embodiments, updating the expiry value may include incrementing a version number as the expiry value.

That is, the value of the existing expiry value may be incremented as an update to the expiry value.

In some embodiments, the termination task may include a task to terminate the module at a future time. Updating the termination task may include canceling an existing termination task and creating a new termination task.

The approaches disclosed herein may facilitate management of module expiration. Clients' requests to refresh modules may be tracked using random numbers and/or version numbers. The random numbers and version numbers may be independent of timestamps associated with the refresh requests. Use of such information may enable reliable management of module expiration in high availability systems. Additionally, use of random numbers to track refresh request may enable management of module expiration that avoids transaction conflicts.

Figure 1:
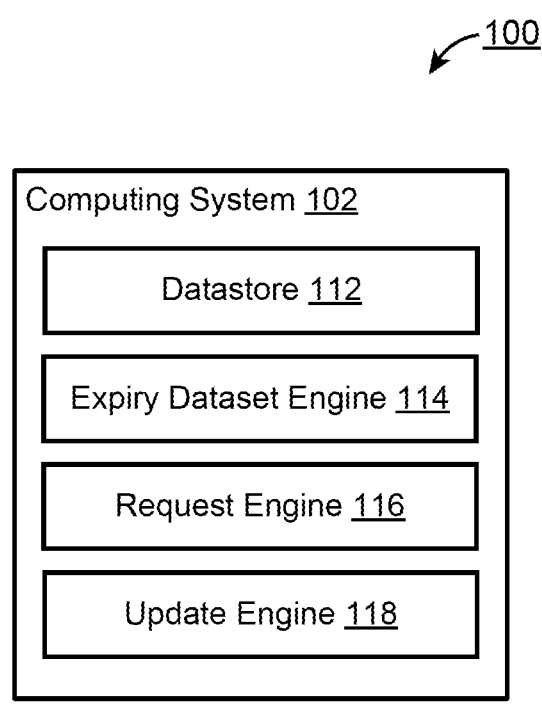
FIG. 1 illustrates an example environment for managing module expiration, in accordance with various embodiments.

FIG. 1 illustrates an example environment 100 for managing module expiration. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, an expiry dataset engine 114, a request engine 116, an update engine 118, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular applications/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the expiry dataset engine 114 may be configured to maintain one or more expiry datasets and/or other information. Maintaining an expiry dataset may include causing and/or enabling the expiry dataset to exist. Maintaining an expiry dataset may include one or more of accessing, acquiring, analyzing, changing, creating, determining, examining, generating, identifying, loading, locating, modifying, reviewing, storing, updating, and/or otherwise maintaining the expiry dataset.

An expiry dataset may be maintained within one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). An expiry dataset may be maintained within one or more databases and/or one or more datastores, such as the datastore 112. An expiry dataset may be maintained using one or more in-memory maps and/or one or more databases. For example, the expiry dataset may be maintained by the expiry dataset engine 114 within an external database, and one or more values of the expiry dataset may be cached in-memory to start the expiry timer.

An expiry dataset may include information relating expiration of one or more modules. The information within the expiry dataset may be organized. For example, an expiry dataset may include a set of identifiers corresponding to a set of modules, a set of expiry values for the set of modules, a set of termination tasks for the set of modules, and/or other information relating to expiration of one or more modules.

A set of modules may include one or more modules. A module may refer to software, a software component, a program, or a part of a program that includes one or more routines to perform work. A module may include one or more routines for performing a particular work or a particular portion of a work. A work may include one or more operations relating to data. For example, a module may include one or more routines for reading, writing, and/or transforming data.

A set of identifiers may include one or more identifiers corresponding to one or more modules. An identifier may refer to information that identifies a module. An identifier may include one or more values and/or one or more combinations of values that uniquely identify a module and/or make up a module identifier.

A set of expiry values may include one or more expiry values for one or more modules. An expiry value may refer to information which may be used to determine whether a module should be kept alive or terminated. An expiry value may change based on a request from a client (e.g., ping) to refresh a module.

A set of termination tasks may include one or more termination tasks for one or more modules. A termination task may refer to a task to terminate a module at a future time. For example, a termination task may include a task to terminate a module at a specific time in the future and/or to terminate a module based on a condition that may occur in the future. A termination task may include a scheduled task to terminate a module.

Running a module may consume resources, such as processing power, processing time, and/or memory. The number of modules that may be run at once may be limited by the pool of available resources. A module may start and/or run based on a client indicating a need for the module. A client may refer to hardware or software that uses and/or accesses one or more services made available by a server. For example, a client may include a computer, a computer component, an application, an application component, a process and/or other hardware/software that requests one or more operations to be performed by or through a server. A client and a server may be part of the same computing system or may be on different computing systems. For example, a client may communicate with a server through one or more networks.

A module may terminate based on a client indicating that it no longer needs the module. For example, a module may terminate based on a client sending a termination request indicating that it no longer needs the module. However, a client may fail to indicate that it no longer needs a module. For example, a client itself may die and fail to indicate that it no longer needs a module. For instance, a client may request a particular module, which may prompt a copy of the module to be started. The client may die before indicating that the particular copy of the module should be terminated.

The client may start again and request the particular module again, which may prompt a second copy of the module to be started. The presence of such a client may result in multiple copies of the module that are needlessly consuming resources.

Given the limited pool of resources available for modules and the possibility that a client may fail to indicate when it no longer needs a module (e.g., fail to send a termination request for a module that is no longer needed), it may be beneficial to terminate modules even when such indication has not been received from a client. To facilitate active termination of modules, a module may be associated with an expiry time. An expiry time may set a time duration during which a request to refresh a module (e.g., a ping) must be received from a client. If a request to refresh a module is not received within the expiry time, the module may be terminated.

A computing system (e.g., the computing system 102, a server) that manages modules (e.g., starts modules, runs modules, terminates modules) may be referred to as a module manager. A module manager may need to track whether a request to refresh a module has been received from a client. The tracking of refresh requests may be used to determine whether a module should be kept alive or terminated. One way of track refresh request may include storing timestamps associated with the refresh requests. For example, the timestamps of when a refresh request was sent, received, and/or processed may be stored. The time indicated by the timestamp may be compared with a current time of the computing system to determine whether a refresh request has been received within an expiry time. If the difference between the times is less than the expiry time, then the corresponding module may be kept alive. If the difference between the times is greater than the expiry time, then the corresponding module may be terminated.

The use of timestamps to track refresh requests may not function properly when multiple module managers are used. Use of multiple module managers may provide high availability of modules. For example, if only a single module manager server provides module management services, the single server may be overloaded by module requests from multiple clients. Additionally, if the single module manager server goes down, the entire system may come to a halt as modules can no longer be managed. On the other hand, using multiple module manager servers may ensure system operation despite failure of some of the servers and enable different clients to contact different servers and/or for a single client to contact different servers at different times to communicate information about modules. For instance, there may be two module manager servers: server A and server B. A client that needs to start a module or a refresh a module may send a module start request or a module refresh request to either server A or server B. However, problem may arise if the client uses multiple servers to refresh the module and the multiple servers use timestamps to track refresh requests. This problem may arise due to difference in clocks of the server A and server B. If the servers are using their clocks to record timestamps of when refresh requests are received, and the servers are operating at different times, then a refresh request that is sent by a client may be tracked using different timestamps depending on which of the servers receive the refresh request. Thus, use of timestamps to track refresh requests in multi-module manager environment may not be reliable.

To provide reliable tracking of refresh requests, module managers may use non-timestamp related information to track refresh requests from clients. In some embodiments, version numbers may be used to track refresh requests. In some embodiments, random numbers may be used to track refresh requests.

In a version-number tracking of refresh requests, a module manager (e.g., a server) may use a version number as an expiry value. The expiry value may be stored and tracked to see if the expiry value has changed within an expiry time. For example, when a module is started, an expiry value for the module may be set to zero and stored in a database. A module manager may maintain a copy (e.g., in-memory copy, database copy) of the expiry value for the module. When a module manager receives a refresh request for a client, the module manager may read and increment the expiry value in the database. The expiry value in the database and the copy of the expiry value (e.g., in-memory copy, database copy) maintained by the module manager may be compared to determine whether the expiry value has changed within the expiry time. That is, the values of the expiry value may be compared to determine whether the version number has been incremented within the time duration during which a request to refresh the module (e.g., a ping) must be received from a client. If the version number has been incremented within the expiry time, the module may be kept alive. If the version number has not been incremented within the expiry time, the module may be terminated. Because the version number inserted as the expiry value is independent of the timestamp associated with the refresh request, use of version numbers to track refresh requests in multi-module manager environment is reliable. That is, the expiry value that uses version numbers remains reliable regardless of difference in times of the module managers or time skew between module managers.

In a random-number tracking of refresh requests, a module manager (e.g., a server) may use a random number as an expiry value. The expiry value may be stored and tracked to see if the expiry value has changed within an expiry time. For example, when a module is started, an expiry value for the module may be set to a random number and stored in a database. A module manager may maintain a copy (e.g., in-memory copy, database copy) of the expiry value for the module. When a module manager receives a refresh request for a client, the module manager may insert a new random number in the expiry value in the database. The new random number may be inserted as the expiry value in the database without reading the existing expiry value. The expiry value in the database and the copy of the expiry value (e.g., in-memory copy, database copy) maintained by the module manager may be compared to determine whether the expiry value has changed within the expiry time. That is, the values of the expiry value may be compared to determine the random number stored as the expiry value has changed within the time duration during which a request to refresh the module (e.g., a ping) must be received from a client. In some embodiments, the random number may include a thirty-two bit number. A random thirty-two bit number may have a value range of 4,294,967,296 (e.g., from 0 through 4,294,967,295). If the expiry value has been changed within the expiry time, the module may be kept alive. If the expiry value has not been changed within the expiry time, the module may be terminated. Because the random number inserted as the expiry value is independent of the timestamp associated with the refresh request, use of random numbers to track refresh requests in multi-module manager environment is reliable. That is, the expiry value that uses random numbers remains reliable regardless of difference in times of the module managers or time skew between module managers.

In various embodiments, the request engine 116 may be configured to receive one or more requests to refresh a module from one or more clients. A request to refresh a module (ping) may be received directly from a client and/or indirectly through one or more intermediary/communication devices. A request to refresh a module may take the form of a command, a signal, a parameter, and/or other form of communication. A request to refresh a module may identify the module. For example, a request to refresh a module may include and/or be associated with the identifier for the module.

In various embodiments, the update engine 118 may be configured to update the expiry dataset. Updating the expiry dataset may include changing one or more portions of the expiry dataset (e.g., changing information contained within the expiry dataset), such as one or more expiry values and/or one or more termination tasks. Multiple portions of the expiry dataset (e.g., information for multiple modules) may be updated at once using batch processing. The update engine 118 may update the expiry dataset based on reception of one or more requests to refresh a module from one or more clients and/or other information. For example, responsive to reception of a request to refresh a module, the update engine 118 may update an expiry value, a termination task, and/or other information for the module within the expiry dataset. The expiry value may be independent of a timestamp associated with the request. For instance, the expiry value may include a random number or a version number, which may not include or may not be dependent on the timestamp at which the request was sent by the client or received. Use of such timestamp-independent expiry values may increase the efficiency of the module expiration management.

In a version-number tracking of refresh requests where a version number is used as an expiry value, updating the expiry value may include incrementing a version number as the expiry value. That is, the value of the existing expiry value may be incremented as an update to the expiry value. For example, if the expiry value stored in a database is zero, the value of zero may be read and incremented to one.

In a random-number tracking of refresh requests where a random number is used as an expiry value, updating the expiry value may include inserting a random number as the expiry value. The random number may include a thirty-two bit number. The random number may be inserted as the expiry value without reading the expiry value in the expiry dataset. That is, updating the expiry value may include inserting the random number as the expiry value without reading the existing expiry value. For example, if a random number is stored in the expiry dataset as the expiry value, a new random number may be inserted to replace the existing random number without reading the existing random number. Inserting the new random number as the expiry value without reading the existing expiry value may increase the speed with which the expiry dataset is updated because time is not expended to read the existing expiry value. Inserting the new random number as the expiry value without reading the existing expiry value may decrease the amount of resource needed to update the expiry dataset because resource is not expended to read the existing expiry value.

Using a random number as an expiry value may also increase the efficiency of module expiration management by avoiding transaction conflicts. A transaction conflict may happen when multiple module managers have open transactions relating to the same module and are attempting to write/change the same value in the expiry dataset. For example, two module managers may receive a refresh request for a module and may attempt to update the expiry value for the module in the expiry dataset. Use of version number as the expiry value requires consistency between updates to the expiry value. That is, because the version number is incremented per refresh request, current value of the version number depends on the prior value of the version number. In other words, the write value of the expiry value update depends on the read value of the existing expiry value. If multiple module managers have open transactions relating to the same module, one module manager may be attempting to read the expiry value (e.g., version number) for a module, another module manager may be writing to the expiry value (e.g., incrementing the version number). Or two module managers may be attempting to write to the same expiry value and only one of the modules may succeed. In such a case, the other module manager may have to read the newly written value to write a new expiry value, thereby wasting time and resource. Such transaction conflicts may make scaling of module/module expiration more difficult.

On the other hand, use of random number as the expiry value does not require consistency between updates to the expiry value. That is, because the version number is changed randomly per refresh request, current value of the version number does not depend on the prior value of the version number. Therefore, use of a random number as an expiry value avoids transaction conflicts and increases the speed with which expiration of modules are managed.

In some embodiments, updating a termination task may include canceling an existing termination task and creating a new termination task. That is, a termination task may include a task to terminate the module at a future time, and updating the termination task may include canceling the existing task to terminate the module at a future time and creating a new task to terminate the module at a future time (e.g., a future time different from the cancelled termination task). In some embodiments, updating a termination task may include modifying an existing termination task. That is, a termination task may include a task to terminate the module at a future time, and updating the termination task may include modifying the existing task to terminate the module at a different (e.g., later) future time. Other updates to the termination task are contemplated.

Figure 2:
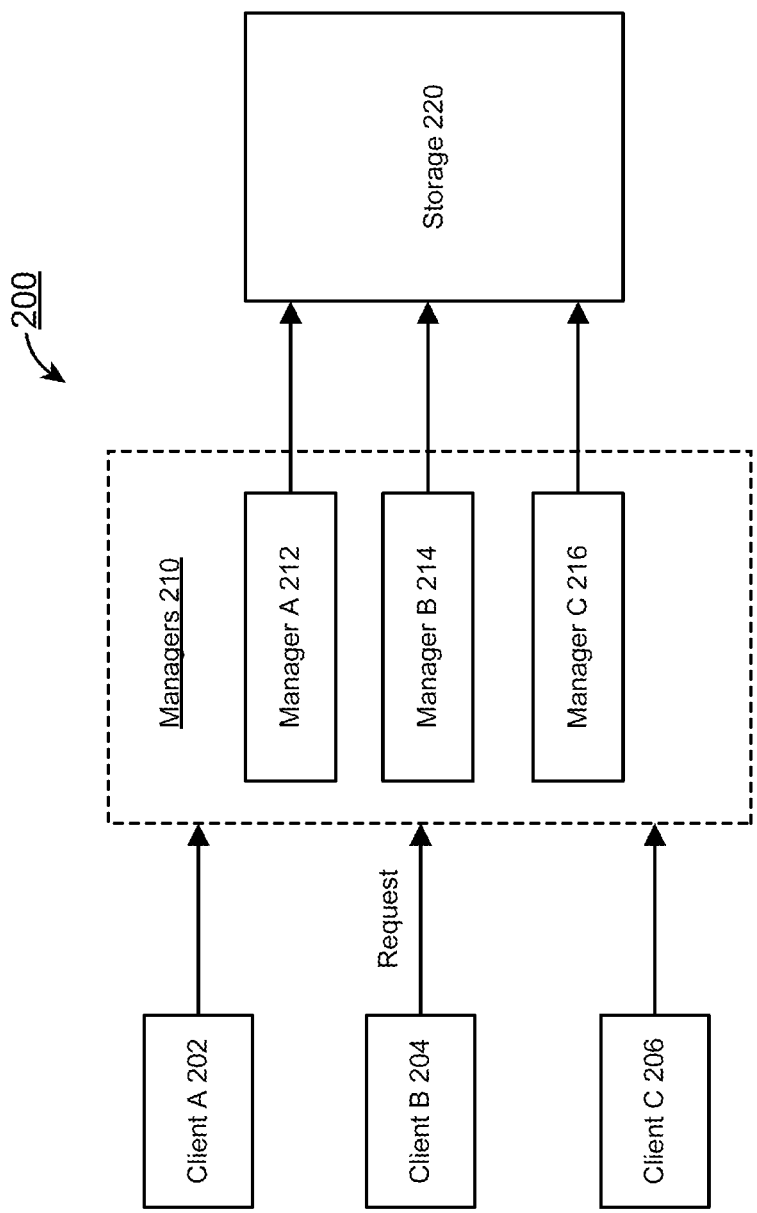
FIG. 2 illustrates an example diagram for managing module expiration, in accordance with various embodiments.

FIG. 2 illustrates an example diagram 200 for managing module expiration, in accordance with various embodiments. The diagram 200 may include a client A 202, a client B 204, a client C 206, managers 210 (including a manager A 212, a manager B 214, a manager C 216), and a storage 220. The managers 210 may include module managers. The clients 202, 204, 206 may submit requests relating to modules to one or more of the managers 210. For example, the client A 202 may submit one or more of a module start request, a module refresh request, and/or a module termination request to one or more of the manager A 212, the manager B 214, and/or the manager C 216. The managers 210 may maintain an expiry dataset within the storage 220. The managers 210 may maintain an in-memory copy of the expiry dataset and/or a database copy of the expiry dataset. The in-memory copy of the expiry dataset may be the same as the expiry dataset stored within the storage 220. The in-memory copy of the expiry dataset may be different from the expiry dataset stored within the storage 220, such as by including more or less information and/or having the information structured differently. The in-memory copy of the expiry dataset may be updated from the expiry dataset stored within the storage 220. Thus, the in-memory copy of the expiry dataset may be current with or behind the expiry dataset stored within the storage 220. A termination task may check the expiry dataset stored within the storage 220 to ensure that the version has not changed before termination. The in-memory copy of the expiry dataset may be used to keep track of the termination tasks (e.g., if the storage version has changed from the in-memory version, the termination task must be updated).

For example, the client A 202 may submit a module start request to the manager A 212. The manager A 212 may prompt storage of an identifier for a module corresponding to the module start request, an expiry value for the module, and a termination task for the module within the storage 220, such as a database within the storage 220. The manager A 212, the manager B 214, and/or the manager C 216 may read the expiry dataset from the storage and maintain an in-memory copy within its memory and/or a copy within a database (e.g., internal database, external database). The client A 202 may submit a refresh request for the module to the manager B 214. The manager B 214 may prompt update of the expiry value and the termination task for the module within the storage 220. For example, a version number used as the expiry value for the module may be incremented. As another example, a random number may be inserted as the new expiry value for the module.

A polling task (e.g., background polling task from the storage 220 to the managers 210) may read identifiers of modules (e.g., active modules) and corresponding expiry values within the expiry dataset to determine whether or not to terminate one or more of the modules. The polling task may run on a periodic basis (e.g., once per second). The polling task may read module identifiers and expiry values within the expiry dataset stored within the storage 220 and compare them to the module identifiers and expiry values stored within the in-memory map/database. If the module is new (e.g., determined based on the module identifier not being listed within the in-memory map/database), a termination task for the module may be created within the expiry dataset of the storage 220 (e.g., with time-to-live value) and the in-memory map/database may be updated. If the expiry value has changed (e.g., determined based on difference between the expiry value within the storage 220 and the expiry value within the in-memory map/database), the expiry value and the termination task within the expiry dataset of the storage 220 may be updated, and the in-memory map/database may be updated. If the expiry value has not changed, no changes may be made to the expiry dataset of the storage 220.

FIG. 3 illustrates an example expiry dataset 300, in accordance with various embodiments. The expiry dataset 300 may include information relating expiration of one or more modules. For example, the expiry dataset 300 may include a set of identifiers (ID-A, ID-B, ID-C, ID-D) corresponding to a set of modules, a set of expiry values (Value A, Value B, Value C, Value D) for the set of modules, a set of termination tasks (Task A, Task B, Task C, Task D) for the set of modules, and/or other information relating to expiration of one or more modules. The set of identifiers may include one or more values and/or one or more combinations of values that uniquely identify a module and/or make up a module identifier. The set of expiry values may include one or more expiry values for one or more modules, which may be used to determine whether a module should be kept alive or terminated. An expiry value may be changed based on a request from a client (e.g., ping) to refresh a module. Based on an expiry value including a version number, the expiry value may be incremented based on a refresh request from a client. Based on an expiry value including a random number, a new random number may be inserted as the expiry value based on a refresh request from a client. The set of termination tasks may include one or more termination tasks to terminate one or more modules at future time(s). A termination task may be changed based on a request from a client (e.g., ping) to refresh a module. For example, an existing termination task may be canceled and a new termination task may be created. As another example, an existing termination task may be modified to terminate a task at another future time. A termination task may check whether the expiry value has changed in a storage database. Change of the expiry value in the storage database may mean that one or more client has refreshed the corresponding module, and the termination task may not terminate the corresponding module.

Figure 4:
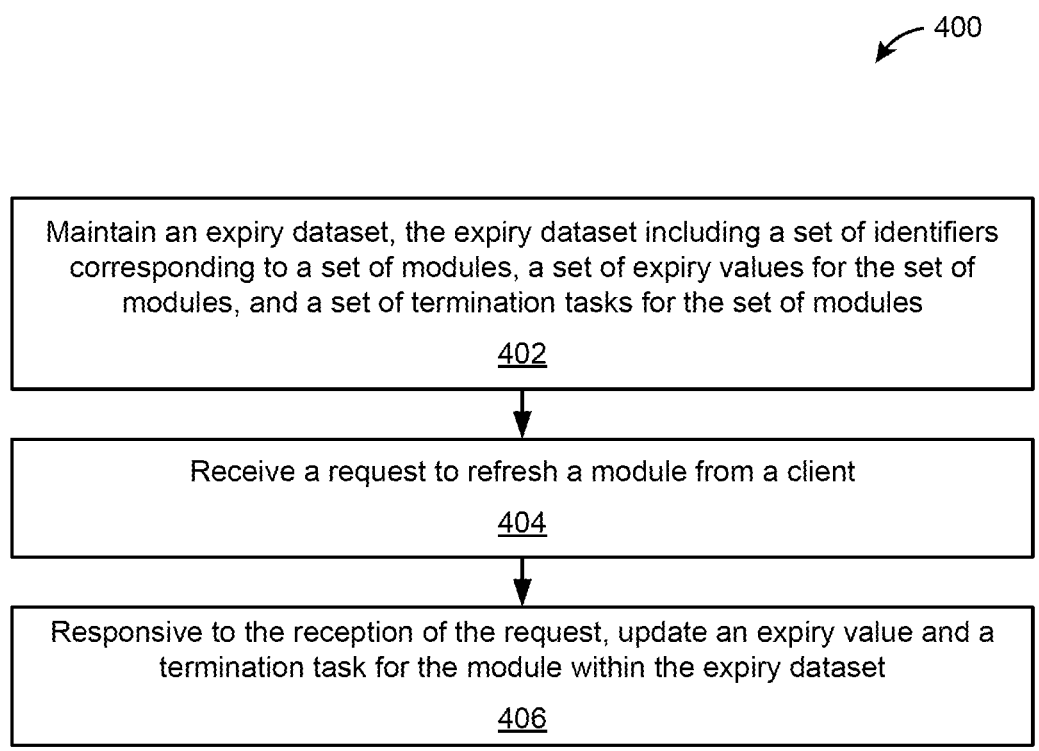
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, an expiry dataset may be maintained. The expiry dataset may include a set of identifiers corresponding to a set of modules, a set of expiry values for the set of modules, and a set of termination tasks for the set of modules. At block 404, a request to refresh a module from a client may be received. At block 406, responsive to the reception of the request, an expiry value and a termination task for the module within the expiry dataset may be updated. The expiry value may be independent of a timestamp associated with the request.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
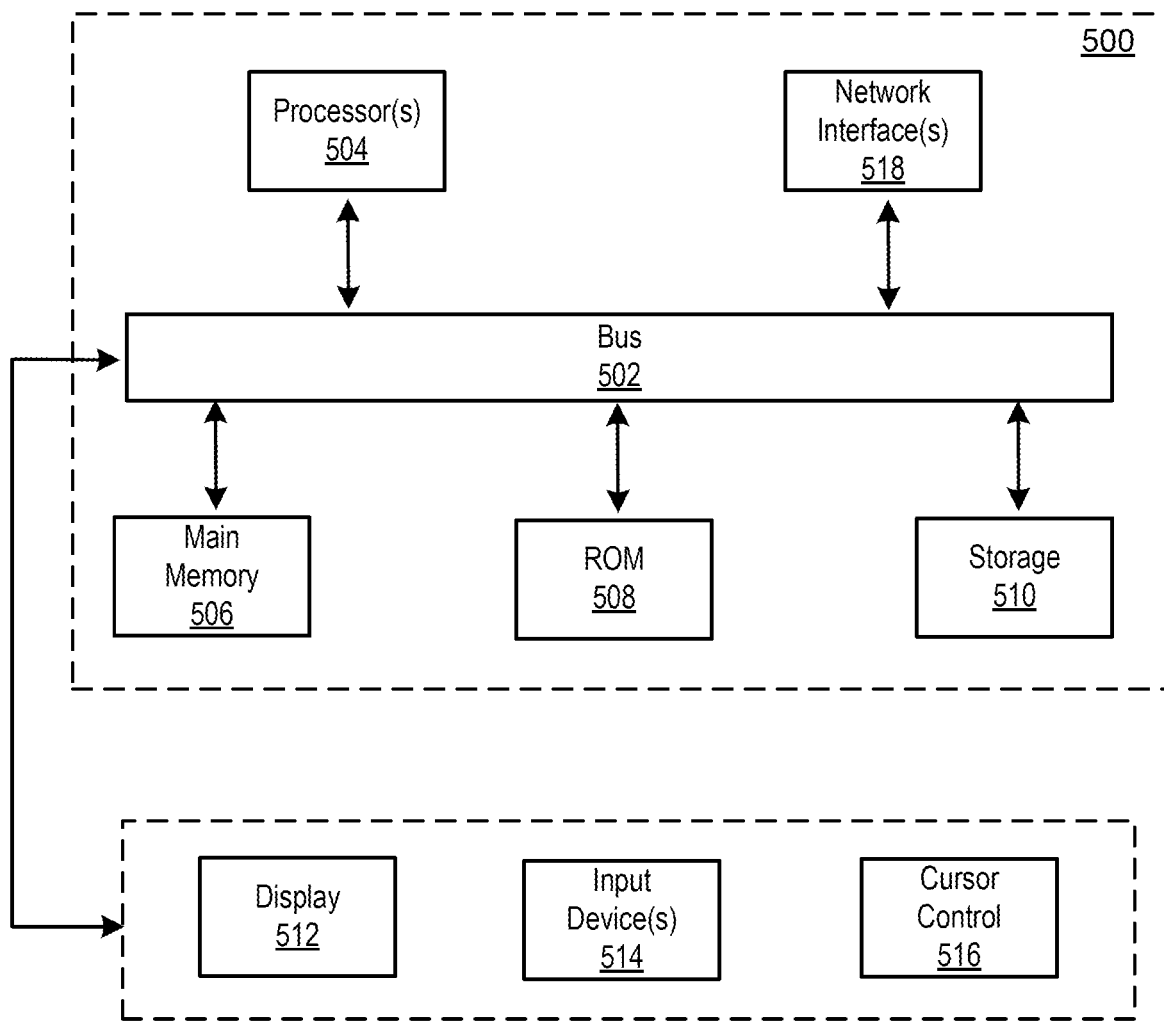
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform:
      receiving, from a client, a request to refresh a module, wherein the request includes an identification of the module, wherein the module comprises one or more hardware or software components or one or more federated processors that perform a computing task related to data transformation;
      updating, based on the request or a different request, a first expiry value and a termination task of the module stored in an internal memory of the system, wherein the updating of the first expiry value comprises updating the first expiry value to a second expiry value;
      comparing, based on the identification of the module, the first expiry value of the module stored in the internal memory of the system with a corresponding starting expiry value of the module stored in a data storage accessible by the system; and
      selectively updating the termination task of the module stored in the internal memory of the system based on the comparison, wherein the termination task effects a termination of the module at a given time in an absence of the request to refresh the module.

2. The system of claim 1, wherein the request to refresh the module extends expiration of the module for use by the client.

3. The system of claim 1, wherein the starting expiry value of the module is a version number associated with the module.

4. The system of claim 3, wherein the termination task includes a time at which the module is terminated for use by the client.

5. The system of claim 4, wherein updating the corresponding termination task of the module stored in the internal memory of the system based on the comparison comprises:
   determining that the version number of the module stored in the data storage has been incremented from the version number of the module stored in the internal memory of the system; and
   updating the termination task stored in the internal memory of the system to terminate access to the module by the client at a future time.

6. The system of claim 5, wherein updating the termination task stored in the internal memory of the system to terminate access to the module by the client at the future time comprises:
   replacing the termination task stored in the internal memory of the system with a new termination task.

7. The system of claim 6, wherein the new termination task comprises a time at which the module with the incremented version number is terminated for use by the client.

8. The system of claim 6, wherein updating the termination task of the module stored in the internal memory of the system based on the comparison comprises:
   refreshing the module being accessed by the client to the module with the version number stored in the data storage at the future time.

9. The system of claim 4, wherein updating the corresponding termination task of the module stored in the internal memory of the system based on the comparison comprises:
   determining that the version number of the module stored in the data storage is same as the version number of the module stored in the internal memory of the system; and updating the termination task stored in the internal memory of the system to extend access to the module by the client to a future time.

10. The system of claim 1, wherein the first expiry value includes a randomly generated value.

11. The system of claim 1, wherein the receiving of the request comprises:
receiving, from the client, at a first server of the system, a first request to store expiration information of a module being accessed by a client; and
receiving, from the client, at one or more second servers of the system, a second request to refresh the module.

12. The system of claim 11, wherein the client comprises a first client, and receiving of the request comprises:
receiving, from a second client, at one or more third servers of the system, a third request to refresh the module; and
updating, based on the third request, the first expiry value to a third expiry value.

13. A method implemented by a computing system including one or more processors and a storage media storing machine-readable instructions, wherein the method is performed using the one or more processors, the method comprising:
receiving, from a client, a request to refresh a module, wherein the request includes an identification of the module, wherein the module comprises one or more hardware or software components or one or more federated processors that perform a computing task related to data transformation;
updating, based on the request or a different request, a first expiry value and a termination task of the module stored in an internal memory of the system, wherein the updating of the first expiry value comprises updating the first expiry value to a second expiry value;
comparing, based on the identification of the module, the first expiry value of the module stored in the internal memory of the system with a corresponding starting expiry value of the module stored in a data storage accessible by the system; and
selectively updating the termination task of the module stored in the internal memory of the system based on the comparison, wherein the termination task effects a termination of the module at a given time in an absence of the request to refresh the module.

14. The method of claim 13, wherein the request to refresh the module extends expiration of the module for use by the client.

15. The method of claim 13, wherein updating the corresponding termination task of the module stored in the internal memory of the system based on the comparison comprises:
determining that a version number of the module stored in the data storage has been incremented from the version number of the module stored in the internal memory of the system; and
updating the termination task stored in the internal memory of the system to terminate access to the module by the client at a future time.

16. The method of claim 13, wherein updating the corresponding termination task of the module stored in the internal memory of the system based on the comparison comprises:
determining that a version number of the module stored in the data storage is same as the version number of the module stored in the internal memory of the system; and
updating the termination task stored in the internal memory of the system to extend access to the module by the client to a future time.

17. A non-transitory computer readable medium of a computing system comprising instructions that, when executed, cause the computing system to perform:
receiving, from a client, a request to refresh a module, wherein the request includes an identification of the module, wherein the module comprises one or more hardware or software components or one or more federated processors that perform a computing task related to data transformation;
updating, based on the request or a different request, a first expiry value and a termination task of the module stored in an internal memory of the system, wherein the updating of the first expiry value comprises updating the first expiry value to a second expiry value;
comparing, based on the identification of the module, the first expiry value of the module stored in the internal memory of the system with a corresponding third expiry value of the module stored in a data storage accessible by the system; and
selectively updating the termination task of the module stored in the internal memory of the system based on the comparison, wherein the termination task effects a termination of the module at a given time in an absence of the request to refresh the module.

18. The non-transitory computer readable medium of claim 17, wherein updating the corresponding termination task of the module stored in the internal memory of the system based on the comparison comprises:
determining that a version number of the module stored in the data storage has been incremented from the version number of the module stored in the internal memory of the system; and
updating the termination task stored in the internal memory of the system to terminate access to the module by the client at a future time.

19. The non-transitory computer readable medium of claim 17, wherein updating the corresponding termination task of the module stored in the internal memory of the system based on the comparison comprises:
determining that a version number of the module stored in the data storage is same as the version number of the module stored in the internal memory of the system; and
updating the termination task stored in the internal memory of the system to extend access to the module by the client to a future time.

* * * * *